United States Patent [19]
Yocum

[11] 3,932,279
[45] Jan. 13, 1976

[54] MULTI-TANK ION EXCHANGE WATER TREATMENT SYSTEM
[75] Inventor: Charles H. Yocum, Roscoe, Ill.
[73] Assignee: Rock Valley Water Conditioning, Inc., Rockford, Ill.
[22] Filed: Oct. 11, 1974
[21] Appl. No.: 514,247

Related U.S. Application Data
[62] Division of Ser. No. 387,115, Aug. 9, 1973, Pat. No. 3,876,539.

[52] U.S. Cl. .................. 210/96; 210/102; 210/139
[51] Int. Cl.² ........................................ B01D 15/06
[58] Field of Search ............. 210/96, 102, 139, 140

[56] References Cited
UNITED STATES PATENTS
3,366,241 1/1968 McMorris ............................ 210/96
3,396,845 8/1968 Bouskill ......................... 210/102 X Primary Examiner—John Adee
Attorney, Agent, or Firm—Wolfe, Hubbard, Leydig, Voit & Osann, Ltd.

[57] ABSTRACT

A series of ion exchangers are connected in parallel in a water treatment system and are electrically interlocked against simultaneous regeneration. After an exchanger regenerates, it is held in standby status and is automatically returned to service use when another exchanger begins its regeneration cycle.

2 Claims, 2 Drawing Figures

MULTI-TANK ION EXCHANGE WATER TREATMENT SYSTEM

CROSS-REFERENCE TO A RELATED APPLICATION

This application is a division of my copending application Ser. No. 387,115, filed Aug. 9, 1973, now U.S. Pat. No. 3,876,539.

BACKGROUND OF THE INVENTION

This invention relates to an ion exchange water treatment system of the type in which two or more ion exchangers are connected in parallel in a water system so as to provide relatively large treatment capacity while keeping water service available to the using system when one of the exchangers is in its regeneration cycle.

More particularly, the invention relates to an ion exchange water treatment system of the type in which a sensor is associated with each exchanger and detects when the exchanger needs regenerating. As an incident to such detection, the sensor causes the associated exchanger to begin a regeneration cycle.

SUMMARY OF THE INVENTION

One of the important aims of the present invention is to provide new and comparatively simple means for interlocking the exchangers to prevent more than one exchanger from regenerating at a time.

A related object is to provide unique means which enable the interlocking of any number of exchangers without increasing the complexity of the interlocking hardware above that required to interlock two exchangers.

Another object is to interlock the exchangers in such a manner as to enable construction of the exchangers as virtually identical modular units and to enable a given exchanger to be used interchangeably in treatment systems equipped with two, three or even more exchangers.

These and other objects and advantages of the invention will become more apparent from the following detailed description when taken in conjunction with the accompanying drawings.

DETAILED DESCRIPTION OF THE PREFERRED EMBODIMENT

Figure 1:
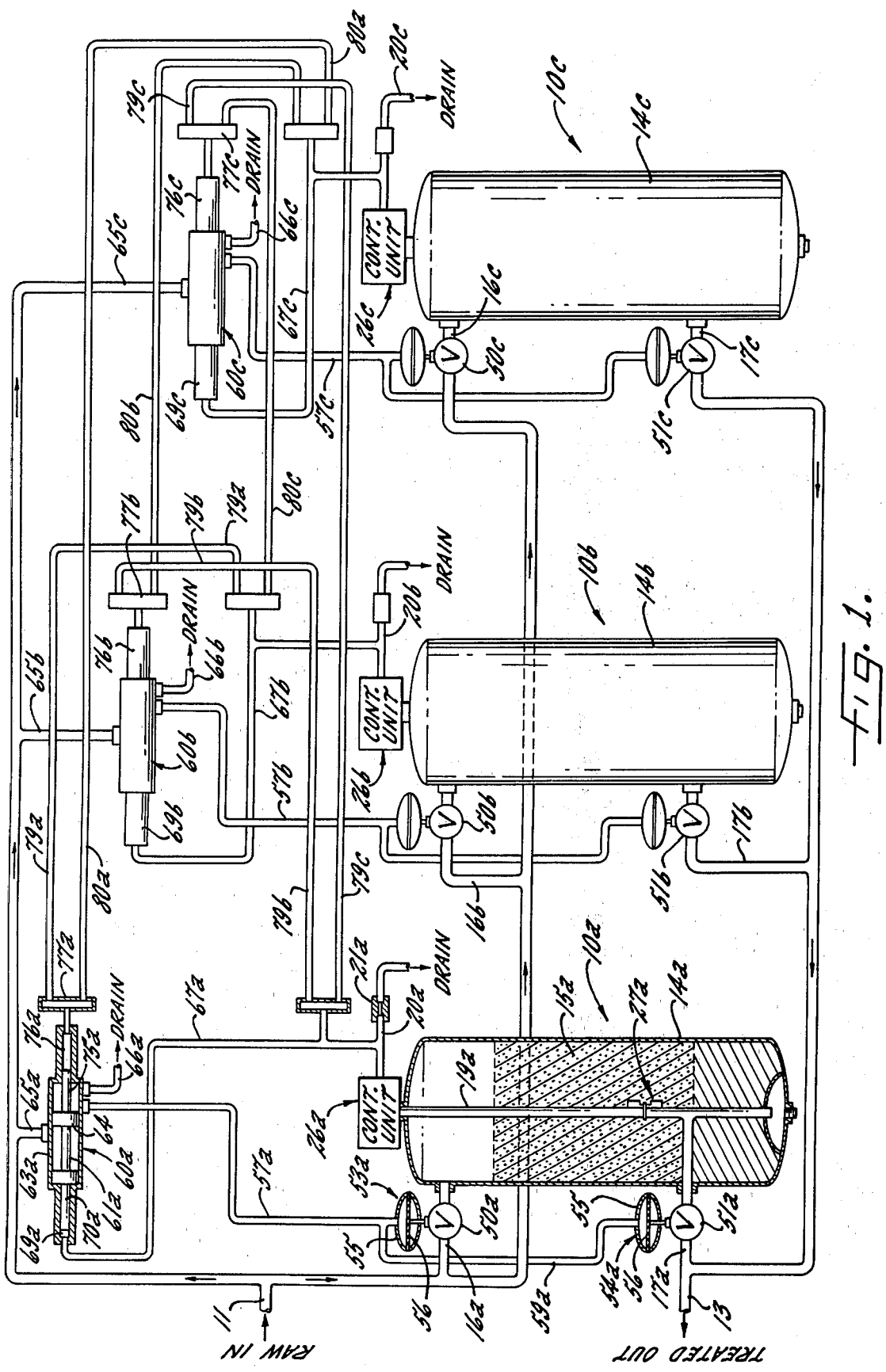
FIG. 1 is a schematic view and fluid circuit diagram of a new and improved ion exchange water treatment system embodying the novel features of the present invention.

As shown in the drawings for purposes of illustration, the invention is embodied in an ion exchange water treatment system having a plurality of ion exchangers 10 which are connected in parallel in a water system to treat raw water flowing from a supply line 11 and to deliver treated water into a service line 13 and then to a using system. Herein, three exchangers 10a, 10b and 10c are shown as being connected into the water system although more than three exchangers could be used and, in many instances, only two exchangers will be employed. With two or more exchangers connected in parallel, a relatively large supply of treated water is made available to the using system and, in addition, the supply of water to the using system is not interrupted when one of the exchangers is being regenerated. Thus, a multi-exchanger treatment system of the type disclosed herein is capable of serving a large using system more adequately than would be the case if only a single exchanger 10 were employed.

The basic exchangers 10 are of well known construction and each includes a tank 14 containing a bed 15 of ion exchange resin. Water flows into the top of each tank through an inlet line 16 communicating with the supply line 11, flows downwardly through the resin bed for treatment, and then flows out of the bottom of the tank through an outlet line 17 communicating with the service line 13.

When the exchangers 10 are regenerated to recondition the resin beds 15, water and regenerating chemicals flow into and out of the tanks through riser pipes 19, the liquid which flows out each tank being carried to a drain by a drain line 20 having a flow controller 21 for restricting the rate of flow. The flow through each riser pipe is controlled by a regenerating valve 23 (FIG. 2) driven by an electrically energized valve motor 24 which, in turn, is controlled by an electrically energized timing motor 25. To simplify the drawings, the valve and the two motors have not been illustrated in detail but instead have been schematically shown as incorporated in a regeneration control unit 26 (FIGS. 1 and 2) located at the top of the tank 14. Various types of conventional regeneration control units may be used and, since the basic construction, organization and operation of such units are well known, these details do not require description here. It will suffice to say that the timing motor 25 of the unit used in the present instance is energized when a sensor 27 (FIGS. 1 and 2) detects the need for regeneration and, once energized, the timing motor causes the exchanger to operate through a complete regeneration cycle.

In one of its aspects, the present invention contemplates interlocking the exchangers 10 to prevent more than one exchanger from regenerating at a time, the interlocking being achieved in a relatively simple and versatile manner and enabling any number of exchangers to be installed in the water system without increasing the complexity of the interlocking hardware. Such simplicity and versatility are achieved by uniquely disabling the sensor 27 of each exchanger whenever any other exchanger is rengerating so that such sensor is incapable of initiating a regeneration cycle even though regeneration may be required.

In one specific embodiment for carrying out the invention, the control units 26 of the exchangers 10 are connected into a control circuit 30 (FIG. 2) having lines L-1 and L-2 connected across a source of voltage such as 120 volts a.c. The circuit 30 includes three control branches 31 connected in parallel combination with one another across the lines L-1 and L-2, there being one control unit 26 connected within and adapted to be energized by way of each control branch. In keeping with the invention, the circuit 30 further comprises three energizing paths 33 which are connected in parallel combination with one another and which include means for energizing the sensors 27. Herein, these means have been shown as being transformers 34 having their primary coils connected into the respective energizing paths 33 and adapted to convert the 120 volts a.c. source voltage into 24 volts d.c. for energizing the sensors 27.

The sensor 27 for each exchanger 10 is attached to the riser pipe 19 (FIG. 1) and has been illustrated in a schematic manner since the sensor which is used herein is well known and since various types of sensors may be used. Basically, the sensor which is disclosed detects the conductivity of the resin bed 15 and produces an electrical signal as an incident to the conductivity reaching a certain level when the bed requires regenerating. The sensor is adapted to be energized by way of a sensing circuit 35 (FIG. 2) and has been illustrated schematically as forming part of a Wheatstone bridge 36 which is normally in balance but which reaches a critical level of imbalance when the conductivity of the resin bed changes sufficiently to dictate the need for regeneration. To energize the sensors 27, the secondary coils of the transformers 34 are included within the respective sensing circuits 35 and are connected to the input terminals of the respective bridge 36. The output terminals of each bridge 36 are connected across a responding means in the form of a normally de-energized relay 37 whose normally open contacts 39 are located in the respective control branch 31 of the control circuit 30.

Let it be assumed that none of the exchangers 10 is in a regeneration cycle and that the sensor 27 of one exchanger (for example, the exchanger 10a) detects that such exchanger requires regeneration. At such time the bridge 36a reaches a critical level of imbalance and supplies the relay 37a with current sufficiently high to energize the relay. Energization of the relay causes closing of the contacts 39a in the control branch 31a so as to energize the timing motor 25a of the control unit 26a. As the timing motor starts up, a cam (not shown) driven by the motor closes a normally open switch 40a which seals around the relay contacts 39a and maintains an energizing circuit to the motor when the relay 37a is subsequently de-energized and the relay contacts re-opened. As will be explained subsequently, the relay 37a is de-energized shortly after the initiation of a regenerating cycle.

After being energized, the timing motor 25a acts through conventional mechanism and circuitry housed within the control unit 26a and illustrated schematically at 41a (FIG. 2) to cause energization of the valve motor 24a at appropriate intervals. The valve motor drives the regenerating valve 23a to different positions to cause the exchanger 10a to operate through a full regeneration cycle. When the regeneration cycle is completed and the valve 23a is returned to service position, the timing motor 25a causes opening of the switch 40a to de-energize the control branch 31a.

In keeping with the invention the exchangers 10 are interlocked against simultaneous regeneration by three normally closed interlocking switches 43a, 43b and 43c connected with one another in the control circuit 30 in a series combination which, in turn, is connected in series with the parallel combination of energizing paths 33. If any one of the interlocking switches 43 is opened, current flow to all of the energizing paths 33 is interrupted and thus the transformers 34 and the sensing circuits 35 are de-energized. Under these conditions, any exchanger which is not already regenerating cannot begin a regeneration cycle because, even if the conductivity of the resin bed 15 of such exchanger reaches the regeneration level, the respective sensing circuit 35 is de-energized and thus the relay 37 cannot be energized to close the contacts 39 in the respective control branch 31.

Again, let it be assumed that none of the exchangers 10 is in a regeneration cycle and that the sensor 27 of one exchanger (the exchanger 10a) detects that such exchanger requires regeneration. When the previously described regeneration cycle is initiated and the valve motor 24a is energized, a cam 44a (FIG. 2) driven by the valve motor causes the interlocking switch 43a to open. As a result, all of the transformers 34 and sensing circuits 35 are de-energized since current flow to the energizing paths 33 is interrupted. Thus, the other two exchangers 10b and 10c cannot begin a regeneration cycle. Even though the relay 37a is de-energized when the switch 43a is opened, the exchanger 10a continues with its regeneration cycle by virtue of the circuit maintained to the control branch 31a by the sealing switch 40a.

The interlocking switch 43a is held open during the entire regenerating cycle of the exchanger 10a and thus the exchangers 10b and 10c are prevented from regenerating. When the exchanger 10a completes its regeneration cycle, the cam 44a closes the interlocking switch 43a to re-establish current flow to all of the energizing paths 33 so that any exchanger which either then or subsequently requires regeneration is capable of beginning its regenerating cycle. It will be appreciated that the interlocking switches 43b and 43c are opened and closed in the same fashion as the interlocking switch 43a and thus the exchangers 10a and 10c are prevented from regenerating when the exchanger 10b is regenerating and the exchangers 10a and 10b are prevented from regenerating when the exchanger 10c is regenerating.

From the foregoing, it will be apparent that the present invention brings to the art a unique arrangement in which the energizing paths 33 for the sensor circuits 35 are connected in parallel combination with one another and are separated or isolated from the parallel combination of the control branches 31. The interlocking switches 43 for controlling the energizing paths 33 are connected in a series combination which is connected in series with the parallel combination of energizing paths. With this arrangement, the circuitry is relatively simple and is virtually identical for each exchanger 10 so as to enable manufacture of the exchangers as substantially identical modular units. In addition, any number of exchangers may be added to the water treatment system and interlocked with the other exchangers without increasing the complexity of the wiring harnesses between the exchangers. For example, it will be seen in FIG. 2 that the exchanger 10a is connected to the exchanger 10b by a four-wire harness (not including a ground wire) and by a jack and plug unit 45a (the latter being shown in four places in the drawing but collectively being one unit). The exchanger 10b, in turn, is connected to the exchanger 10c by a similar four-wire harness and jack and plug unit 45b. Any number of exchangers may be connected into the system with similar four-wire harnesses and without need of providing additional wiring within the harnesses. The lead exchanger 10a, of course, includes an additional harness leading to the a.c. voltage source, the the jack 45c of the harness of the final exchanger 10c is suitably jumpered as indicated at 46 in order to complete the control circuit 30.

Advantageously, the exchangers 10 are hydraulically interconnected in a novel manner so that each exchanger which completes its regenerating cycle is not immediately returned to service use but instead is held in a reserve or standby status until such time as another exchanger begins its regenerating cycle. In this way, a freshly regenerated exchanger is made available to the using system whenever another exchanger begins regenerating and thus a continuous supply of treated water is insured.

In order to prevent a given exchanger 10 from returning to service use after it completes its regenerating cycle, the flow system through the exchanger is closed off during the regenerating cycle and is kept closed until another exchanger begins regeneration. To close off the flow system, shut-off valves 50 and 51 (FIG. 1) are connected into the inlet and outlet lines 16 and 17 of each exchanger and are adapted to be moved between opened and closed positions by fluid-operated actuators 53 and 54. In this instance, each valve actuator comprises a walled chamber 55 which is divided into two compartments by a flexible diaphragm 56, the latter being spring-biased in an upward direction and being connected to the shut-off valve. When fluid under pressure is admitted into the upper side of the chamber 55 of the upper actuator 53 through a line 57 the respective diaphragm is flexed downwardly to close off the valve 50 in the inlet line 16. At the same time, pressure is transmitted to the upper side of the chamber of the lower actuator 54 through a line 59 and serves to close off the valve in the outlet line 17. When the pressure is dumped from the line 57, both valves are automatically returned to their open positions by virtue of the upward spring bias applied to the diaphragms 56.

To control the flow of pressure fluid to and from the valve actuators 53 and 54, a pilot valve 60 is associated with each exchanger 10 and includes a valve spool 61 slidable within a housing 63. When the valve spool is shifted to the right from the position shown in FIG. 1, a land 64 is located so as to enable the line 57 to communicate with a line 65 connected to the supply line 11. Accordingly, water under pressure is directed to the actuators 53 and 54 to close the shut-off valves 50 and 51. When the spool 61 is returned to the left, the line 57 communicates with a drain line 66 and thus the water is dumped from the actuators to allow the shut-off valves to return to their open positions.

Figure 2:
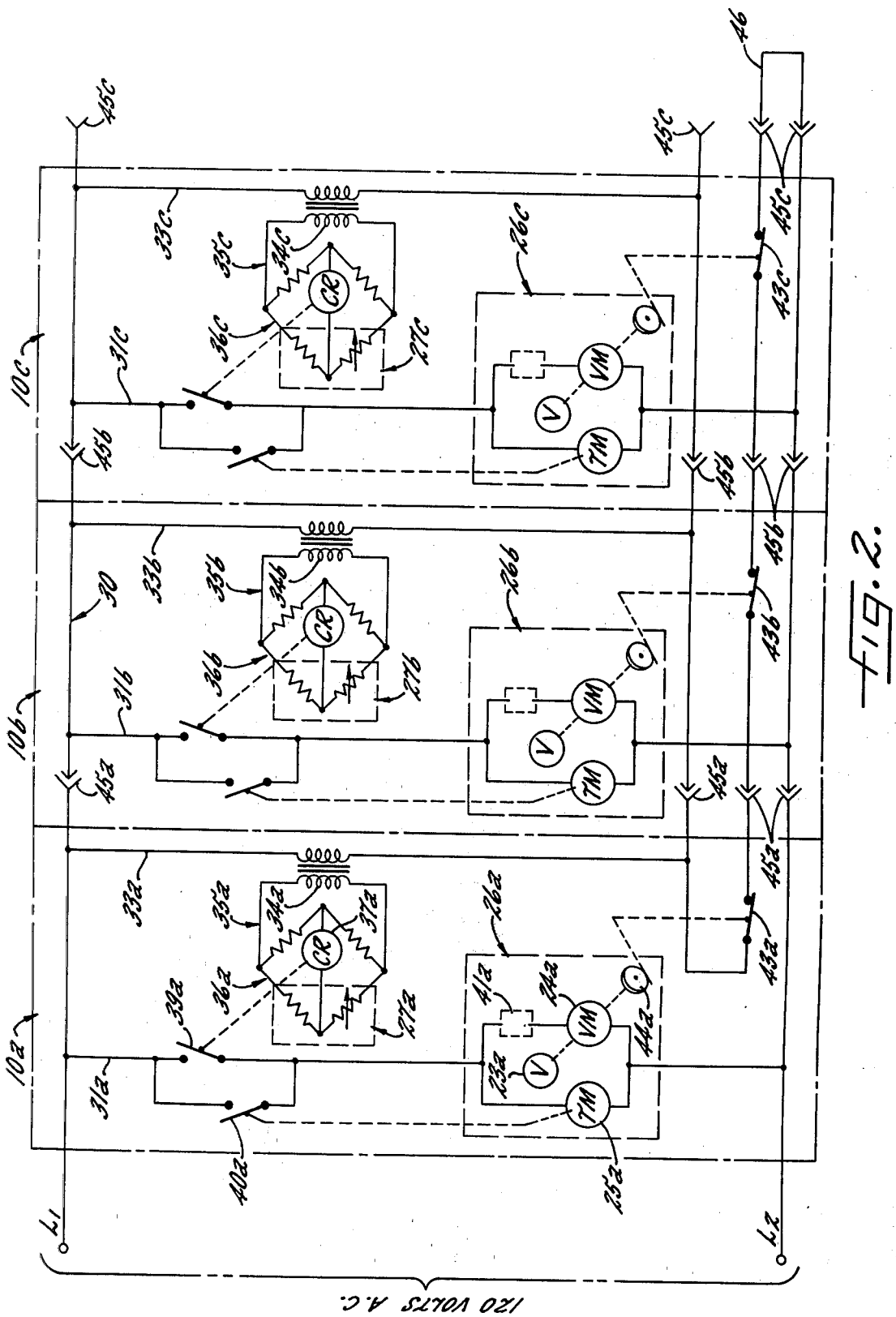
FIG. 2 is a diagram of the electric control circuit for the treatment system shown in FIG. 1.

Normally, the valve spool 61 of each pilot valve 60 is located to the left in a service position as shown in FIG. 1. When the associated exchanger 10 begins its regenerating cycle, the valve spool is shifted to the right to a standby position to close off the flow system of the exchanger and thus take the exchanger out of service use. To shift the valve spool from its service position to its standby position, a line 67 communicates with the exchanger drain line 20 at a point upstream from the flow controller 21 and also communicates with a chamber 69 located at the left end of the valve housing 63, there being a piston 70 slidable in the chamber and connected to the valve spool 61. When the exchanger begins its regenerating cycle, liquid flows through the drain line 20 and, because of the restriction created by the flow controller 21, a pressure pulse is created in the line 67 and is transmitted to the piston 70 to shift the valve spool 61 to the right to its standby position. Thus, the shut-off valves 50 and 51 are closed automatically as an incident to the exchanger beginning its regenerating cycle.

The spool 61 of a given pilot valve 60 remains in its standby position even after the associated exchanger 10 completes its regenerating cycle and is returned to service position only when another exchanger begins regeneration. To return the spool to its service position, a pressure pulse is transmitted to a piston 75 connected to the right end of the valve spool and slidable within a chamber 76 at the right end of the valve housing 63. The chamber 76 communicates with a header 77 which, in turn, communicates with the drain lines 20 of the other two exchangers by way of lines 79 and 80. Thus, when either of the other two exchangers 10 begins a regeneration cycle, a pressure pulse from one of the drain lines 20 is transmitted through the lines 79 or 80 to the piston 75 of the valve spool 61 in standby position. The spool thus is shifted to the left to its service position to cause opening of the shut-off valves 50 and 51 of the associated exchanger and thereby switch the exchanger from standby to service.

From the foregoing, it will be apparent that two functions are performed by the pressure pulse produced in the drain line 20 of any given exchanger 10 when that exchanger begins its regeneration cycle. That is, the pressure pulse shifts the valve spool 61 of the regenerating exchanger into its standby position so that the exchanger will not return to service when its regenerating cycle is completed. Secondly, the pressure pulse simultaneously acts on the valve spool of the exchanger which has previously been on standby and shifts that valve spool to its service position so as to switch the associated exchanger from standby to service. In this way, a freshly regenerated exchanger is brought into service each time another exchanger begins its regeneration cycle. Since the exchangers are electrically interlocked against simultaneous regeneration, it is not possible for a pressure pulse to exist in more than one drain line 20 at any given time. Accordingly, when pressure is applied to one of the pistons 70 or 76 of any valve spool, there is no back pressure against the other piston and thus the spool may shift freely. Moreover, once shifted, the valve spool remains in a stable position until it is shifted reversely by a pressure pulse originating from another exchanger.

I claim as my invention:

1. An ion exchange water treatment system comprising a plurality of ion exchangers adapted to be connected in parallel in a water system, an electric control circuit associated with all of said exchangers, said control circuit including a plurality of control branches and further including a plurality of energizing paths, there being one control branch and one energizing path associated individually with each exchanger, all of said control branches being connected in parallel with one another in said circuit and all of said energizing paths being connected in parallel combination with one another in said circuit, energizing means in each of said energizing paths, an electric sensing circuit associated individually with each exchanger and normally energized by the respective energizing means, each of said sensing circuits including a sensing means normally operable to produce an electric signal in said sensing circuit upon detecting that the respective exchanger needs regeneration, responding means in each of said sensing circuits and normally triggered by the signal produced by the respective sensing means when the latter detects the need for regeneration, each of said responding means being operable when triggered to produce an electric signal in the respective control branch, means associated individually with each exchanger and responsive to the signal produced in the respective control branch to cause the respective exchanger to regenerate, a switching device associated individually with each exchanger, all of said switching devices being connected in a series combination which is connected in series with the parallel combination of energizing paths, and means associated individually with each switching device for placing the respective switching device in a first condition when the exchanger begins regeneration and for placing the switching device in a second condition when the exchanger completes regeneration, the switching device of any one exchanger being operable when in said first condition to disable the energizing means for the sensing circuit of every other exchanger thereby to prevent the sensing means in every other sensing circuit from producing its signal so only one exchanger may regenerate at a time.

2. An ion exchange water treatment system as defined in claim 1 in which at least three ion exchangers are connected in parallel in said water system.

* * * * *